United States Patent
Kim (10) Patent No.: US 9,719,796 B2
(45) Date of Patent: Aug. 1, 2017

(54) INTERSECTION GUIDANCE METHOD, NAVIGATION SERVER, NAVIGATION TERMINAL, AND NAVIGATION SYSTEM INCLUDING THE SAME

(71) Applicant: Hyundai Motor Company, Seoul (KR)

(72) Inventor: Hyun Min Kim, Gwangmyeong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/957,727

(22) Filed: Dec. 3, 2015

(65) Prior Publication Data

US 2017/0074676 A1  Mar. 16, 2017

(30) Foreign Application Priority Data

Sep. 10, 2015  (KR) ........................ 10-2015-0128076

(51) Int. Cl.
  *G01C 21/00* (2006.01)
  *G01C 21/36* (2006.01)
  *G01C 21/34* (2006.01)

(52) U.S. Cl.
  CPC ......... *G01C 21/3679* (2013.01); *G01C 21/34* (2013.01); *G01C 21/3446* (2013.01)

(58) Field of Classification Search
  CPC ................................ G01C 21/34; G08G 1/202
  USPC .................................... 701/410, 533, 23, 24
  See application file for complete search history.

(56) References Cited

U.S. PATENT DOCUMENTS

2006/0149463 A1* 7/2006 Machii ................... G01C 21/34
                                                                    701/533
2016/0147416 A1* 5/2016 Macfarlane ............. G06F 3/017
                                                                    715/747

FOREIGN PATENT DOCUMENTS

| JP | 2003-232647    | 8/2003 |
|----|----------------|--------|
| JP | 2004-144721    | 5/2004 |
| JP | 3908056        | 1/2007 |
| JP | 2007-163437    | 6/2007 |
| JP | 2008-045962    | 2/2008 |
| JP | 4345345        | 7/2009 |
| JP | 2014-098587    | 5/2014 |
| KR | 10-2015-0053850 | 5/2015 |

* cited by examiner

*Primary Examiner* — Gertrude Arthur Jeanglaude
(74) *Attorney, Agent, or Firm* — Brinks Gilson & Lione (57) ABSTRACT

The present disclosure relates to an intersection guidance method, a navigation server, a navigation terminal, and a navigation system including the same using point-of-interest (POI) information specialized for a user in order to provide enhanced intersection turn guidance. In one form, the method includes: tracing a route to a destination designated by a user and performing route guidance along the route; when an intersection on the route is detected, determining a representative point-of-interest (POI) from among one or more POIs corresponding to the intersection on the basis of profile information of the user; and performing turn guidance at the intersection using the representative POI.

13 Claims, 8 Drawing Sheets

INTERSECTION GUIDANCE METHOD,
NAVIGATION SERVER, NAVIGATION
TERMINAL, AND NAVIGATION SYSTEM
INCLUDING THE SAME

CROSS-REFERENCE TO RELATED APPLICATIONS

This application claims the benefit of and priority to Korean Patent Application No. 10-2015-0128076, filed Sep. 10, 2015, which is incorporated herein by reference as its entirety.

FIELD

The present disclosure relates to an intersection guidance method, a navigation server, a navigation terminal, and a navigation system including the same for use with vehicles.

BACKGROUND

The statements in this section merely provide background information related to the present disclosure and may not constitute prior art.

A navigation system is a system for providing information for traveling of vehicles using satellites and is also called an autonomous navigation system.

The navigation system receives predetermined data from global positioning system (GPS) satellites using a GPS receiver and calculates the position thereof on the basis of the received data.

In addition, the navigation system can provide information that aids in driving, such as informing a user of the current location of a vehicle on the basis of the position information thereof, routing a route to a desired destination and guiding the user to the route.

The navigation system stores geometry data about maps and point-of-interest (POI) information indicating buildings, roads and the like on the maps and uses the stored geometry information and the POI information as information for route guidance.

That is, the navigation system receives signals including latitude and longitude information from GPS satellites, calculates the location of a user, outputs the calculated location and provides a route to a desired destination of the user while map-matching POI information to geometry information arranged according to latitude and longitude.

With a recent increase in the number of vehicles, the number of intersections having a plurality of access roads increases since roads are widened or additional roads are built. When such an intersection is present on a route, the navigation system indicates information about an exit direction and an entry direction of the intersection as an image on geometry information and provides voice guidance about the entry direction on the basis of a distance.

However, since conventional intersection guidance provides guidance about a turn (e.g. right turn 500 m ahead) through distance guidance on the basis of the current position, a user's ability to judge distance is deteriorated or a user who is unaccustomed to distance judgment has a difficulty in judging an access road of an intersection.

At an intersection having many access roads or complicated access roads, a user may enter the wrong access road or miss an access road and may be confused about entry to the intersection, which can obstruct safe driving.

In addition, in the case of guidance of a turn at an intersection on the basis of a distance, navigation services providing route guidance may provide different guidance points, and thus an early adaptation period for a guided distance is desired.

SUMMARY

The present disclosure has been developed to provide an intersection guidance method, a navigation server, a navigation terminal, and a navigation system including the same for providing a turn direction at an intersection using POI information specialized for a user from among POI information present around the intersection.

In one form, the present disclosure provides an intersection guidance method including: tracing a route to a destination designated by a user and performing route guidance along the route; when an intersection on the route is detected, determining a representative point-of-interest (POI) from among one or more POIs corresponding to the intersection on the basis of profile information of the user; and performing turn guidance at the intersection using the representative POI.

A navigation terminal according to one aspect of the present disclosure traces a route to a destination designated by a user, performs route guidance along the route and, when an intersection on the route is detected, performs turn guidance at the intersection using a representative POI determined on the basis of profile information of the user, from among one or more POIs corresponding to the intersection.

A navigation server according to one aspect of the present disclosure includes: a personal profile database storing user profile information corresponding to vehicle information; a POI database storing at least one POI corresponding to intersection information and POI profile information of the at least one POI; and a representative POI determination algorithm execution unit for determining one of the at least one POI as a representative POI by comparing the profile information with the POI profile information.

A navigation system according to one aspect of the present disclosure includes: a navigation terminal for tracing a route to a destination designated by a user, performing route guidance along the route and, when an intersection on the route is detected, performing turn guidance at the intersection using a representative POI determined on the basis of profile information of the user, from among one or more POIs corresponding to the intersection; and a navigation server including a personal profile database storing user profile information corresponding to vehicle information, a POI database storing at least one POI corresponding to intersection information and POI profile information of the at least one POI, and a representative POI determination algorithm execution unit for determining one of the at least one POI as a representative POI by comparing the profile information with the POI profile information.

According to the aforementioned intersection guidance method, navigation server, navigation terminal and navigation system including the same according to embodiment form of the present disclosure, it is possible to reduce confusion about entry to an intersection or a turn point at the intersection and to provide safer driving environments by providing guidance of a turn at the intersection in such a manner that a POI more familiar to a user is provided to the user by reflecting characteristics of the user who drives a vehicle through the intersection.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
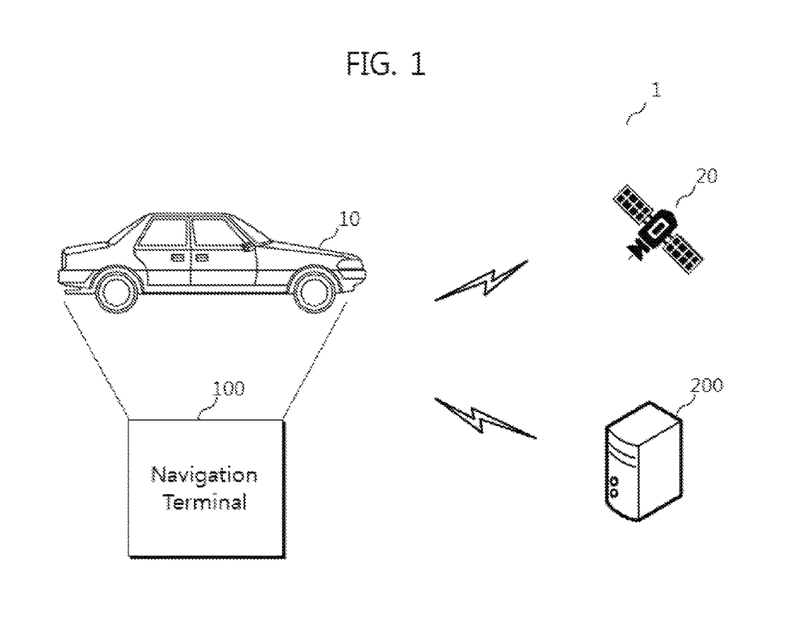
FIG. 1 is a block diagram of a navigation system according to one form of the present disclosure.

Referring to FIG. 1, a navigation system 1 according to the present disclosure may include a vehicle 10, a global positioning system (GPS) satellite 20, a navigation server 200 and a navigation terminal 100.

The vehicle 10 is provided with the navigation terminal 100 through which a navigation service can be provided. The navigation service aids in driving the vehicle 10 by monitoring the location of the navigation terminal 100 in real time, indicating the location of the navigation terminal 100 on a map and showing moving route to a destination designated by a user. Since the vehicle 10 is equipped with the navigation terminal 100, the location of the navigation terminal 100 can be assumed to be the location of the vehicle 10.

A head unit of the vehicle 10 performs control operations such as air-conditioning and management of the vehicle 100 and can transmit/receive control or data signals by being electrically connected to the navigation terminal 100.

The GPS satellite 20 is a satellite located above the earth and can provide a navigation message to the navigation terminal 100. While FIG. 1 shows one GPS satellite 20, more than three GPS satellites may be located above the earth.

The navigation server 200 provides the navigation service and may be implemented as a telematics center. The navigation server 200 can provide a telematics service. The telematics service provides a navigation function, various multimedia functions such as a burglar alarm, emergency rescue (SOS), remote diagnosis, supplies administration, hands-free mobile phone, living information, personal information, secretary service and Internet access, an interactive Internet function and a mobile service, using a telematics terminal.

The navigation server 200 may manage opening of the service of the terminal provided to the vehicle 10, collect information that the user requires, transmit the collected information to the terminal set in the vehicle 10 or transmit information received from the terminal to a network operator server or a corresponding organization (e.g. an insurance company or an emergency rescue center).

The navigation server 200 may operate, inside or outside of the center, a database for storing and managing information about the vehicle 10, information about the navigation terminal 100, map data, firmware upgrade information of the navigation terminal 100 and the like.

The navigation terminal 100 may be implemented as a telematics terminal. However, the present disclosure is not limited thereto.

A navigation service application may be installed in the navigation terminal 100 and executed when the vehicle 10 is started and thus the navigation terminal 100 is automatically booted.

Figure 2:
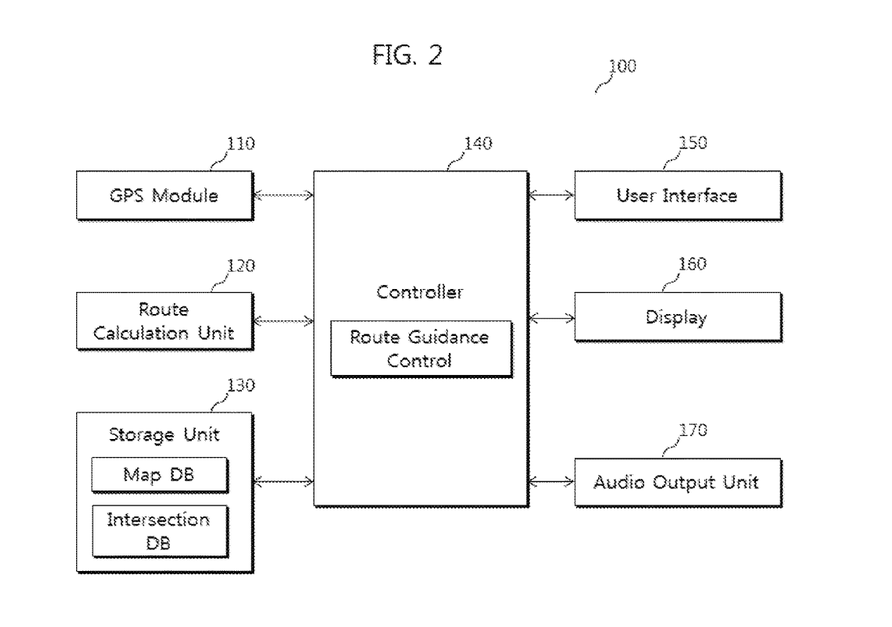
FIG. 2 is a block diagram of a navigation terminal shown in FIG. 1.
Figure 3:
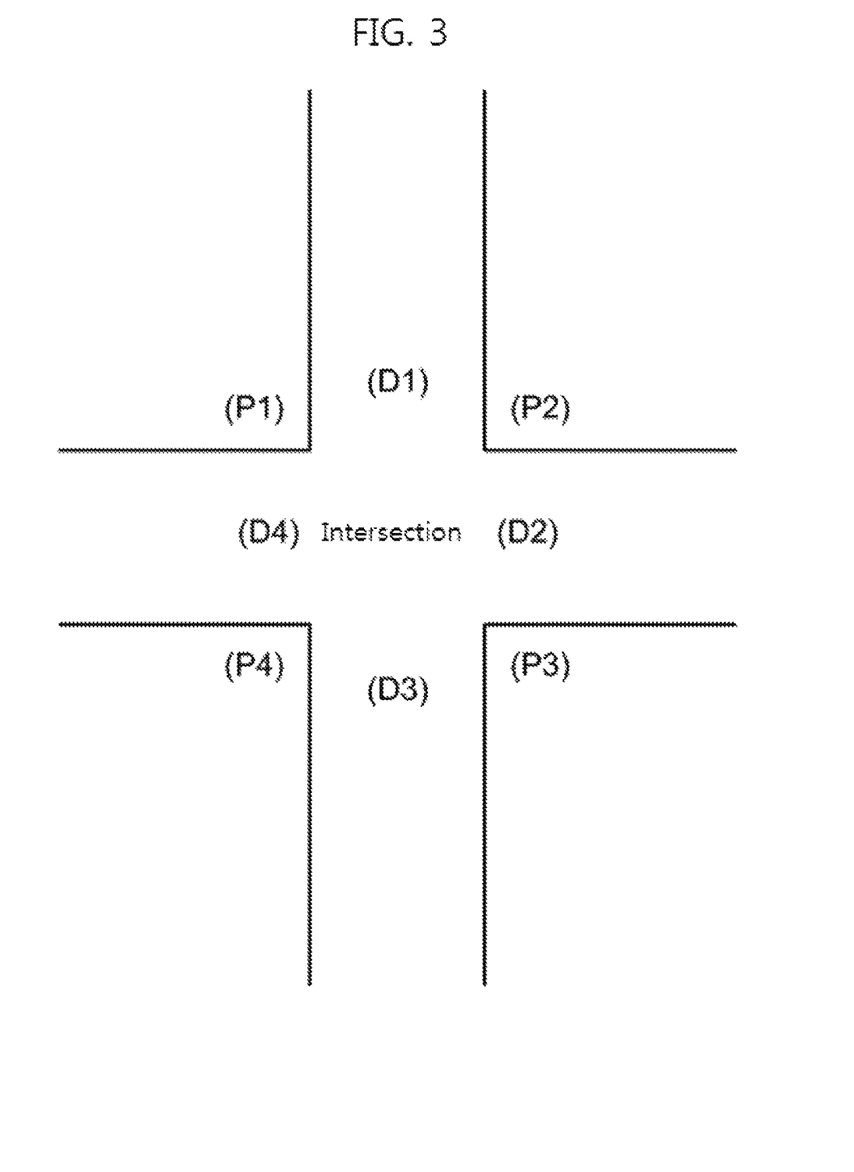
FIG. 3 shows representative POIs designated for exit points, entry points and turn directions according to turn directions at an intersection.

FIG. 2 is a block diagram of the navigation terminal shown in FIG. 1 and FIG. 3 shows representative POIs designated for exit points, entry points and turn directions according to turn directions at an intersection.

Referring to FIGS. 2 and 3, the navigation terminal 100 includes a GPS module 110, a route calculation unit 120, a storage unit 130, a controller 140, a user interface 150, a display 160 and an audio output unit 170.

The GPS module 110 may receive a navigation message from the GPS satellite 20 and calculate the location thereof.

The storage unit 130 includes a map data storing map data about a national map and route guidance data related to the map data. The storage unit 130 stores a control program for controlling the overall operation of the navigation terminal 100, including a route guidance function and an intersection turn guidance function during route guidance.

The intersection turn guidance guides a turn direction at an intersection using a POI around the intersection. To achieve this, it is desired to construct a database (referred to as an intersection database hereinafter) of representative POI information about intersections. It is desirable to construct the intersection database by designating a POI present at a position which is easily recognized by the user, from among a plurality of POIs around the intersection, as a representative POI according to a turn direction at the intersection.

The intersection database stores intersections included in the national map, turn directions at each intersection and a representative POI according to each turn direction per intersection and is included in the storage unit 130.

Turn directions at each intersection correspond to routes from each intersection, through which vehicles can be turned according to traffic laws, and include at least one of a left turn, a right turn, a U-turn, a P-turn and a rotary turn. A representative POI is designated according to each traveling course available per intersection and input to the intersection database, and regulated turning courses are not input to the intersection database.

The representative POI may be determined by the navigation server 200 whenever an intersection on a traveling route of the user is detected and received and stored by the navigation terminal 100. However, the present disclosure is not limited thereto. For example, representative POIs for all intersections included in the map stored in the map database may be simultaneously received and stored during rebooting or firmware upgrade of the navigation terminal 100.

FIG. 3 shows representative POIs designated for exit points, entry points and turn directions according to turn directions at an intersection.

For example, when the intersection includes four access roads D1, D2, D3 and D4, it is possible to designate P2 as a representative POI for a turn between the access roads D1 and D2, P3 as a representative POI for a turn between the access roads D2 and D3, P4 as a representative POI for a turn between the access roads D3 and D4 and P1 as a representative POI for a turn between the access roads D4 and D1.

Alternatively, different representative POIs may be set for a turn from the access road D1 to the access road D2 and a turn from the access road D2 to the access road D1. Representative POIs for turns at other access roads may be set in the same manner.

The representative POI may be designated as a POI present at a position most easily recognized by the user or a position easily confirmed within a predetermined distance when the user drives the vehicle in each turn direction at the corresponding intersection.

In one form of the present disclosure, the representative POI is determined by a method illustrated in FIG. 6, which will be described later.

When the access road D3 is a starting point at the intersection and a left turn and a right turn are allowed at the intersection, P4 is used as the representative POI when the vehicle is turned to the left from the access road D3 to the access road D4 and P3 is used as the representative POI when the vehicle is turned to the right from the access road D3 to the access road D2. Here, the access road D3 corresponding to the starting point becomes an exit point and the access roads D4 and D2 corresponding destinations become entry points.

Accordingly, turn directions at each intersection are defined and an exit point, an entry point and a representative POI per turn direction are designated and input to the intersection database.

The intersection database in one form assigns IDs to intersections and representative POIs of the intersections and stores the intersections and the representative POIs in consideration of information update. It is possible to change information on the intersections and the representative POIs by updating an ID table of the intersection database.

The intersection database includes an ID of each intersection, an exit point and an entry point for each turn direction per intersection, and an ID of each representative POI pre-designated for each turn direction, as shown in Table 1.

TABLE 1

Intersection ID
Exit point
Entry point
Representative POI ID

A representative POI according to a turn direction of the corresponding intersection can be recognized through the corresponding intersection IP, exit point and entry point stored in the intersection database and intersection turn guidance can be provided through the recognized representative POI.

The route calculation unit 120 detects the current location of the user using a GPS signal received through the GPS module 110 and traces a route from the current location to a destination designated by the user from map data stored in the map database of the storage unit 130 so as to generate route information.

The controller 140 performs route guidance according to the route on the basis of the route information generated by the route calculation unit 120. In addition, the controller 140 performs turn guidance at an intersection using a POI on the basis of the information stored in the intersection database of the storage unit 130 when the vehicle approaches the intersection on the route.

The user interface 150 is an input means through which a user command with respect to the navigation system, such as a destination for the route guidance function, is input and is configured in the form of a touch pad integrated with the display 160 so as to provide a graphical user interface. A user command is input in such a manner that all menu environments related to the route guidance function of the navigation terminal 100 are provided as a graphics screen through the display 160 such that the user touches a specific point on the graphics screen using a stylus pen or a finger.

The display 160 is a means for displaying information about the overall operation of the system and map information for route guidance and may use a liquid crystal display (LCD), an organic electro-luminescent (EL) display or the like.

The audio output unit 170 is a means for performing voice guidance when the route guidance function is executed for a route and may provide voice guidance including a representative POI corresponding to a turn direction during guidance of the turn at the corresponding intersection.

Figure 4:
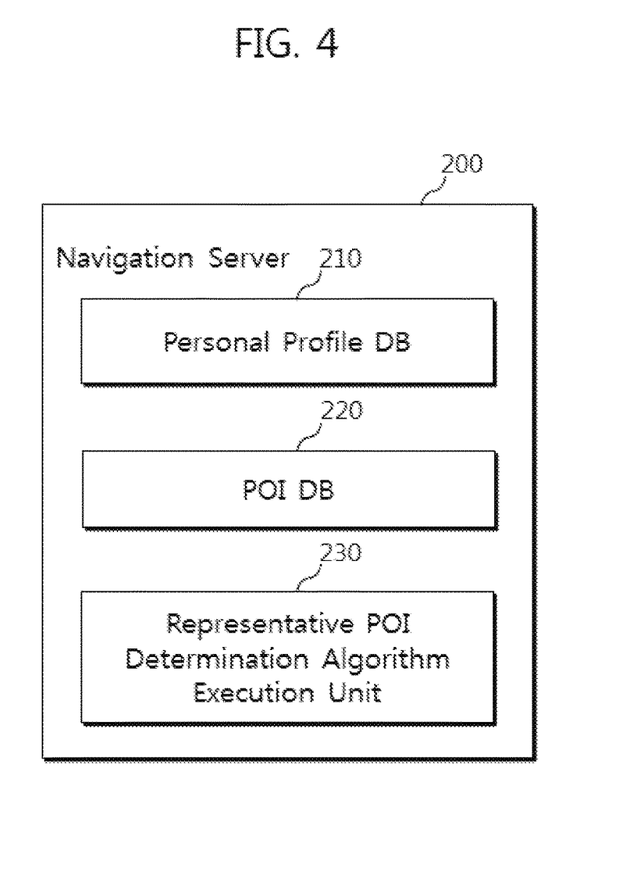
FIG. 4 is a block diagram of a navigation server shown in FIG. 1.

FIG. 4 is a block diagram of the navigation server shown in FIG. 1.

Referring to FIG. 4, the navigation server 200 may include a personal profile database 210, a POI database 220 and a representative POI determination algorithm execution unit 230.

The personal profile database 210 may manage personal information of a user who subscribes to the navigation service and store profile information per user. That is, personal information of a user can be input through an initial screen or setting when the service of the navigation terminal 100 is initiated or the navigation program is executed. The personal information can be transmitted to the navigation server 200 and stored per user in the personal profile database 210. Each user can be identified according to vehicle information. The vehicle information may be a vehicle identification number (VIN). The personal information may include the age, sex, area, major concern, occupation, marital status and the like of the user and may be stored per item.

The POI database 220 can store POIs per intersection included in the map data about the national map. The POI database 220 can store at least one POI included in an area corresponding to a turn direction at a corresponding intersection, which is identified through the corresponding intersection ID, exit point and entry point. That is, the POI database 220 can store at least one POI per area identified by intersection information including an intersection ID, an exit point and an entry point.

In addition, the POI database 220 can store POI profile information and the number of selections as a representative POI per POI.

The representative POI determination algorithm execution unit 230 can search the personal profile database 210 and the POI database 220 on the basis of vehicle information and intersection information transmitted from the navigation terminal 100 and determine a representative POI of the navigation terminal 100 by executing a representative POI determination algorithm. The representative POI determination algorithm will be described later with reference to FIG. 6.

Figure 5:
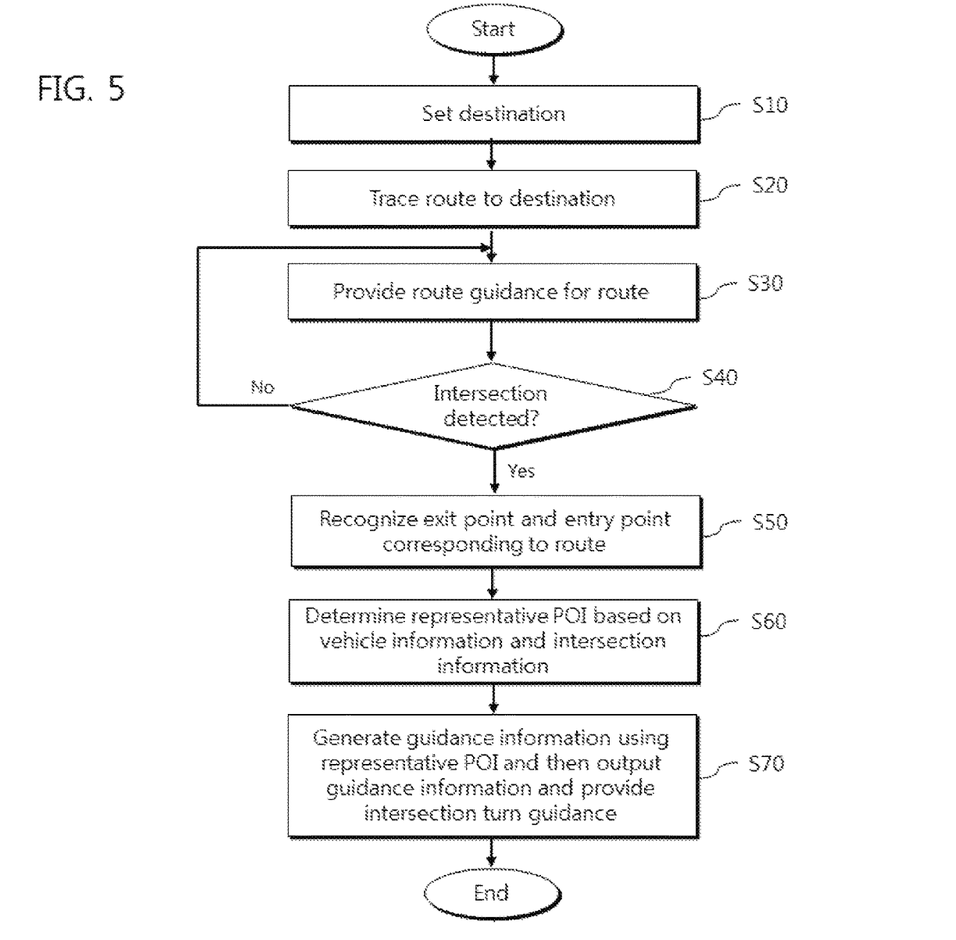
FIG. 5 is a flowchart illustrating an intersection guidance method according to an embodiment of the present disclosure.
Figure 6:
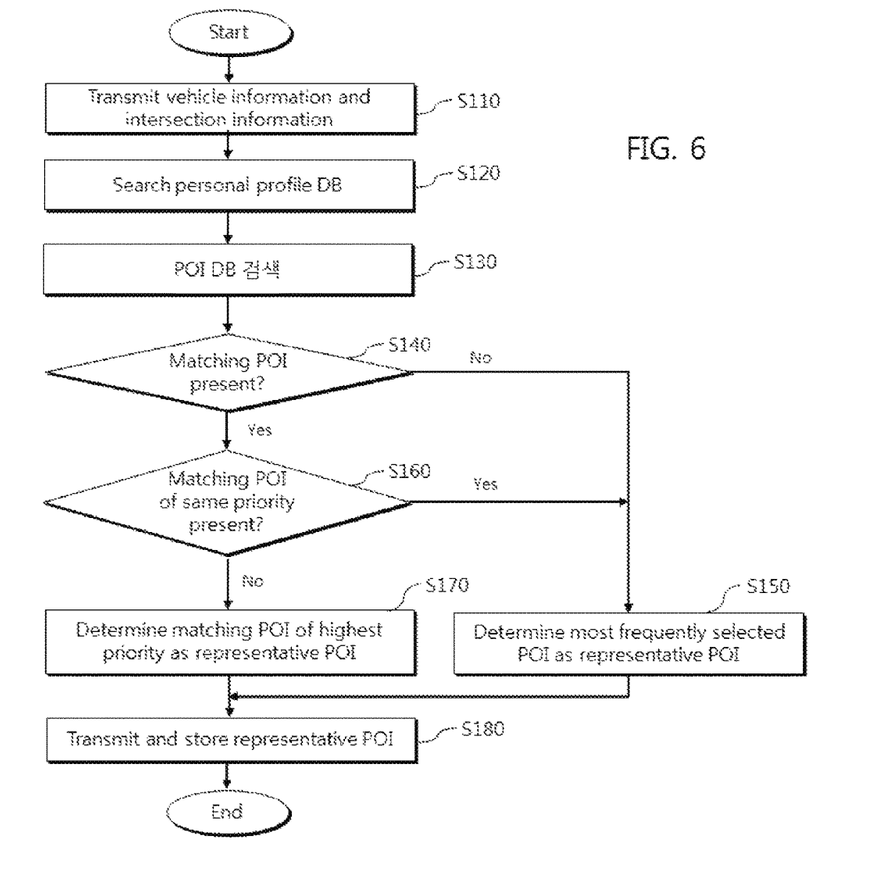
FIG. 6 is a flowchart illustrating step S60 shown in FIG. 5.
Figure 7:
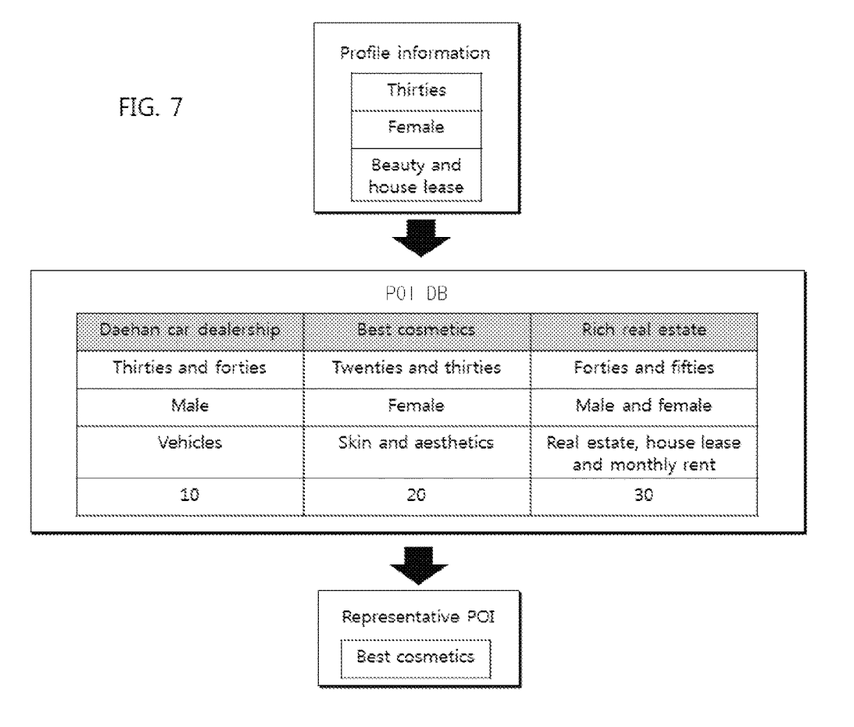
FIGS. 7 and 8 are views for explaining a method of determining a representative POI according to one form of the present disclosure.
Figure 8:
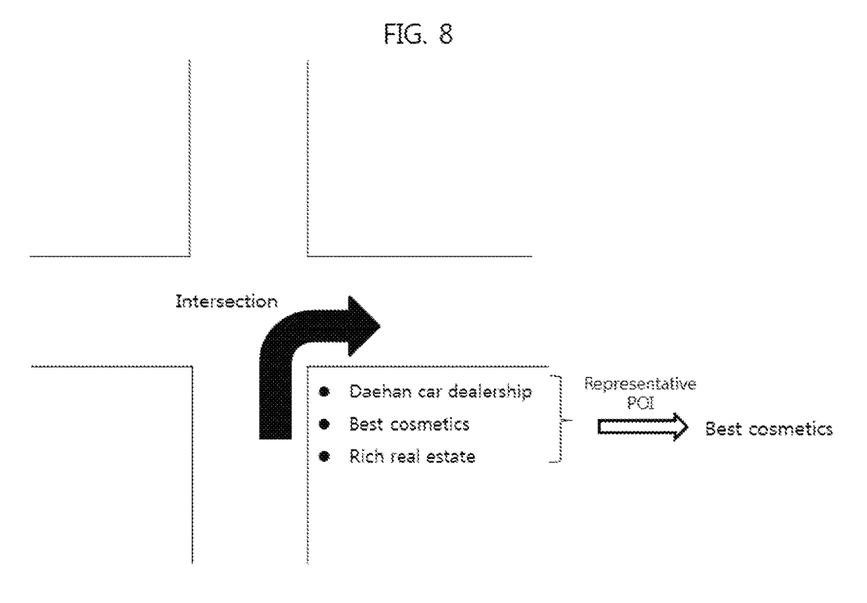

FIG. 5 is a flowchart illustrating an intersection guidance method according to one form of the present disclosure, FIG. 6 is a flowchart illustrating step S60 shown in FIG. 5 and FIGS. 7 and 8 are views for explaining a method of determining a representative POI according to one form of the present disclosure.

Referring to FIGS. 1 to 8, the user executes a user menu for setting a destination on the navigation program of the navigation terminal 100 and sets a destination for the route guidance function through the user menu (S10) in FIG. 5.

When the user requests the route guidance service for the set destination, the current location of the user is calculated from a location signal received through the GPS module 10 and a route from the calculated current location to the set destination (S20).

Subsequently, a map screen and voice guidance for the route are generated such that the user drives the vehicle along the route so as to provide route guidance service (S30).

An intersection located in front of the vehicle on the route is detected in a predetermined period during route guidance to the destination (S40). Intersection detection may be performed in such a manner that whether the coordinate value of the intersection, that is, the intersection, is present a predetermined distance ahead of the current location is determined with reference to map data and intersection location information stored in the map database.

Upon detection of the intersection the predetermined distance ahead in the detection step S40, a turn direction at the intersection according to the traveling direction on the route is recognized and an exit point and an entry point of the intersection are recognized from the turn direction (S50).

The navigation terminal 100 transmits vehicle information of the user and intersection information to the navigation server 200. The navigation server 200 determines a representative POI by performing the representative POI determination algorithm on the basis of the vehicle information of the user and the intersection information and transmits the representative POI to the navigation terminal 100 (S60).

The representative POI is stored in the intersection database of the storage unit 130. The navigation program provides intersection turn guidance by accessing information on the corresponding intersection using the intersection ID, generating guidance information about the intersection using a representative POI corresponding to the exit point and the entry point of the intersection and outputting the generated guidance information (S70). The intersection turn guidance is performed in such a manner that the representative POI read from the intersection database is displayed in a form different from other POIs or voice guidance including the representative POI is provided.

FIG. 6 is a flowchart illustrating step S60 shown in FIG. 5. The navigation terminal 100 transmits the vehicle information and the intersection information to the navigation server 200 (S110). The vehicle information may be the vehicle identification number of the vehicle equipped with the navigation terminal 100. The intersection information may include the intersection ID, exit point and entry point.

When the navigation server 200 receives the vehicle information and the intersection information, the representative POI determination algorithm execution unit 230 extracts profile information corresponding to the vehicle information by searching the personal profile database (210) (S120). That is, the representative POI determination algorithm execution unit 230 can identify the user who subscribed to the navigation service using the vehicle information and extract profile information corresponding to the user from the personal profile database 210.

The representative POI determination algorithm execution unit 230 searches the POI database 220 to extract at least one POI corresponding to the intersection information and POI profile information and the number of selections as a representative POI with respect to the at least one POI (S130). That is, the representative POI determination algorithm execution unit 230 can identify the corresponding intersection and traveling direction using the intersection information and extract at least one POI corresponding to the intersection and traveling direction and POI profile information and the number of selections as a representative POI with respect to the at least one POI.

The representative POI determination algorithm execution unit 230 can determine whether the at least one POI includes a matching POI on the basis of the profile information extracted from the personal profile database 210 (S140). The matching POI refers to a POI having an item corresponding to an item of the POI profile information of the at least one POI per item of the profile information. The POI profile information refers to profile information closely related to the nature (characteristics of business type, brand image and the like) of the corresponding POI per item corresponding to each item of the profile information. For example, when the POI corresponds to a skincare center, POI profile information of the skincare center can be "thirties and forties" with respect to the age item, "female" with respect to the sex item and "skin, aesthetics and elasticity" with respect to the main concern item. The POI profile information can be prestored in the POI database 220 by an administrator of the navigation server 200 and periodically updated.

When the matching POI is present (Yes of S140), the representative POI determination algorithm execution unit 230 can determine whether a matching POI of the same priority is present (S160). Here, priority is determined by the number of items corresponding to the profile information. A POI can be determined as a higher priority POI as the number of items of the POI, which correspond to the profile information, increases. In addition, whether a plurality of matching POIs having the highest priority is present is determined.

When a matching POI of the same priority is not present (No of S160), the representative POI determination algorithm execution unit 230 can determine a matching POI of the highest priority as a representative POI (S170).

When no matching POI is present (No of S140) or a matching POI of the same priority is present (Yes of S160), the representative POI determination algorithm execution unit 230 can determine a POI corresponding to the largest number of selections as a representative POI, from among at least one POI, as a representative POI (S150). The number of selections as a representative POI refers to the number of selections as a representative POI by unspecified navigation terminals including the navigation terminal 100 at the corresponding intersection in the traveling direction prior to the current time. Accordingly, a POI corresponding to a larger number of selections as a representative POI has higher possibility of being well known to many people.

The representative POI determination algorithm execution unit 230 transmits the determined representative POI to the navigation terminal 100, and the navigation terminal 100 updates the representative POI to the intersection database of the storage unit 130 (S180).

The representative POI determination algorithm is provided with vehicle information and intersection information, extracts profile information, at least one POI, POI profile information of the at least one POI and the number of selections as a representative POI of the at least one POI, determines matching POIs by comparing the profile information with the POI profile information and determines a representative POI in consideration of priority of the matching POIs and the number of selections as a representative POI.

According to the intersection guidance method according to one form of the present disclosure as described above, since a POI more familiar to a user can be selected as a representative POI used for vehicle driving guidance at an intersection by reflecting user characteristics to provide intersection turn guidance, confusion about entry to the intersection or a turning point can be minimized and a safer driving environment can be provided.

In addition, intersection turn guidance is provided using a well-known POI by determining a POI, which is most frequently selected as a representative POI, as the representative POI, thereby minimizing confusion about entry to the intersection or a turning point and providing a safer driving environment.

FIG. 7 illustrates an example of determining a representative POI when profile information extracted according to vehicle information transmitted from the navigation terminal 100 includes items of the age, sex and main interest of users.

Specifically, it is assumed that the extracted profile information includes "thirties", "female" and "beauty" and "house lease" as the age, sex and main concern items.

In addition, it is assumed that, when a traveling direction corresponds to a right turn at an intersection, the corresponding area includes "Daehan car dealership", "Best cosmetics" and "Rich real estate", as shown in FIG. 8.

The representative POI determination algorithm execution unit 230 extracts three POIs ("Daehan car dealership", "Best cosmetics" and "Rich real estate") corresponding to intersection information, POI profile information of the three POIs and the numbers of selections as a representative POI with respect to the three POIs by searching the POI database 220.

As shown in FIG. 7, the POI profile information of "Daehan car dealership" includes "thirties and forties", "male" and "vehicles" as the respective items, and the number of selections as a representative POI thereof is 10. The POI profile information of "Best cosmetics" includes "twenties and thirties", "female" and "skin and aesthetics" as the respective items, and the number of selections as a representative POI thereof is 20. The POI profile information of "Rich real estate" includes "forties and fifties", "male and female" and "real estate, house lease and monthly rent" as the respective items, and the number of selections as a representative POI thereof is 30.

The representative POI determination algorithm execution unit 230 determines whether at least one POI includes a matching POI on the basis of profile information extracted from the personal profile database 210. The POIs, "Daehan car dealership", "Best cosmetics" and "Rich real estate", respectively have one, three and two items, which correspond to the profile information. In this case, three matching POIs are present.

If the POIs, "Daehan car dealership", "Best cosmetics" and "Rich real estate", have no item corresponding to the profile information, "Rich real estate", which corresponds to a highest number of selections as a representative POI, can be determined as a representative POI.

Since three matching POIs are present in FIG. 7, the representative POI determination algorithm execution unit 230 determines whether a matching POI of the same priority is present. In this case, "Best cosmetics" is a matching POI of the highest priority. Accordingly, the representative POI determination algorithm execution unit 230 determines the matching POI of the highest priority as a representative POI.

If "Best cosmetics" and "Rich real estate" correspond to matching POIs having the highest priority, "Rich real estate" corresponding to a larger number of selections as a representative POI, between "Best cosmetics" and "Rich real estate", can be determined as a representative POI.

In the example as shown in FIG. 7, "Best cosmetics" is determined as a representative POI as shown in FIG. 8, and the navigation terminal 100 can provide intersection turn guidance (e.g., "right turn in front of 'Best cosmetics' 200 m ahead") using "Best cosmetics".

The aforementioned intersection guidance method, navigation terminal, navigation server and navigation system including the same may be implemented as computer-readable code stored in a computer-readable recording medium. The computer-readable recording medium includes all kinds of recording media storing data readable by a computer system. Examples of the computer-readable recording medium include a ROM, a RAM, a magnetic tape, a magnetic disc, a flash memory, an optical data storage device and the like. In addition, the computer-readable recording medium may be distributed to computer systems connected through a computer communication network, stored and executed as code readable in a distributed manner.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An intersection guidance method, comprising:
   tracing a route to a destination designated by a user and performing route guidance along the route;
   when an intersection on the route is detected, determining a representative point-of-interest (POI) from among one or more POIs corresponding to the detected intersection by:
   receiving intersection information related to the detected intersection and vehicle information;
   extracting a user profile information corresponding to the vehicle information;
   selecting at least one POI from a plurality of POIs corresponding to the intersection information;
   extracting POI profile information corresponding to the at least one POI;
   comparing the user profile information with the POI profile information; and
   determining the at least one POI as the representative POI based on the comparison of the user profile information with the POI profile information; and
   performing turn guidance at the intersection using the representative POI.

2. The intersection guidance method of claim 1, wherein the determining of the representative POI by comparing the user profile information with the POI profile information comprises:

comparing the user profile information with the POI profile information and determining whether matching POIs are present according to whether the user profile information and the POI profile information have matching items; and determining whether the matching POIs include a matching POI of the same priority according to the number of matching items.

3. The intersection guidance method of claim 2, wherein the determining of the representative POI by comparing the user profile information with the POI profile information further comprises determining a matching POI of highest priority as the representative POI when the matching POIs include no matching POI of the same priority.

4. The intersection guidance method of claim 2, wherein the determining of the representative POI by comparing the user profile information with the POI profile information further comprises determining a most frequently selected POI as the representative POI when the matching POIs are not present or the matching POIs include a matching POI of the same priority.

5. The intersection guidance method of claim 1, wherein the vehicle information is a vehicle identification number.

6. The intersection guidance method of claim 1, wherein the intersection information includes an intersection ID, an exit point and an entry point.

7. A navigation terminal for tracing a route to a destination designated by a user, performing route guidance along the route and, when an intersection on the route is detected, performing turn guidance at the intersection using a representative POI determined on a basis of profile information of the user, from among one or more POIs corresponding to the intersection, wherein vehicle information and intersection information about the detected intersection are transmitted to a navigation server, and the representative POI in which characteristics of the user are reflected on a basis of the vehicle information and the intersection information is received from the navigation server.

8. The navigation terminal of claim 7, wherein the vehicle information is a vehicle identification number.

9. The navigation terminal of claim 7, wherein the intersection information includes at least one of an intersection ID, an exit point and an entry point.

10. A navigation server, comprising:
a personal profile database storing user profile information corresponding to vehicle information;
a POI database storing at least one POI corresponding to intersection information and POI profile information of the at least one POI; and
a representative POI determination algorithm execution unit for determining one of the at least one POI as a representative POI by comparing the user profile information with the POI profile information, and determines whether matching POIs are detected according to whether the user profile information and the POI profile information include matching items and determines whether the matching POIs include a matching POI of a same priority according to the number of matching items.

11. The navigation server of claim 10, wherein when the matching POIs include no matching POI of the same priority, the representative POI determination algorithm execution unit determines a matching POI of highest priority as the representative POI.

12. The navigation server of claim 10, wherein, when the matching POIs are not present or the matching POIs include a matching POI of the same priority, the representative POI determination algorithm execution unit determines a most frequently selected POI as the representative POI.

13. The navigation server of claim 10, wherein the vehicle information is a vehicle identification number.

* * * * *